May 27, 1930.    H. W. FLETCHER ET AL    1,760,051
QUICK OPERATING VALVE
Filed Nov. 7, 1927
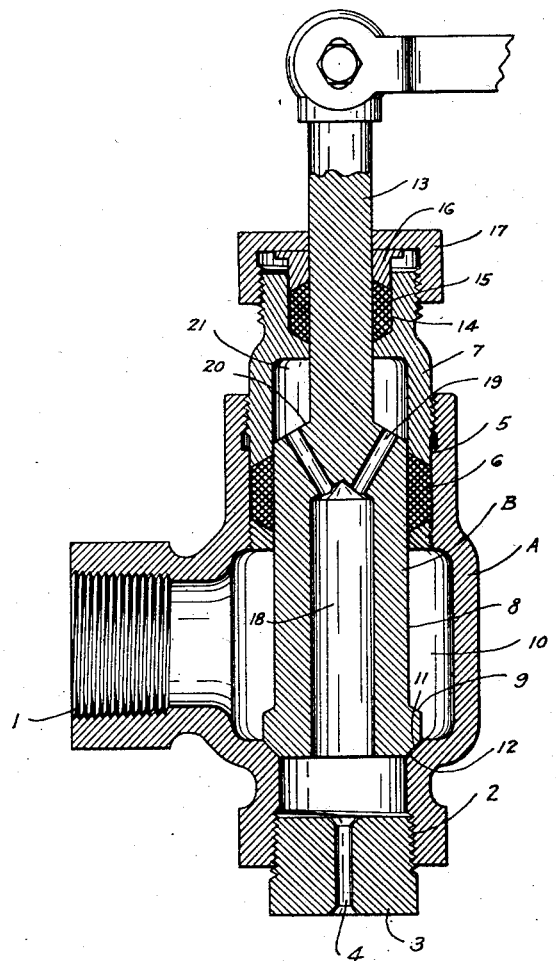
Ralph Neuhaus
Harold W. Fletcher INVENTORS
BY Jesse R. Stone
ATTORNEY Patented May 27, 1930

1,760,051

UNITED STATES PATENT OFFICE

HAROLD W. FLETCHER AND RALPH NEUHAUS, OF HOUSTON, TEXAS, ASSIGNORS TO HUGHES TOOL COMPANY, OF HOUSTON, TEXAS, A CORPORATION OF TEXAS

QUICK-OPERATING VALVE

Application filed November 7, 1927. Serial No. 231,760.

Our invention relates to valves to be employed in flow lines. It is particularly adapted for use in oil field work where the fluid is accompanied by sand or other abrasive material.

It sometimes occurs in flowing fluid from deep wells that the fluid comes from a formation containing loose sand or similar abrasive material which tends to wear the operating parts of the valves in the line. This wear takes place most rapidly where the valve is close to its seat, when the valve is opening or closing. The wire-drawing of the sandy fluid past the valve surfaces causing abrasion of the valve and its seat.

It is an object of our invention to provide a valve and seat, so formed and mounted in their housing as to open and close abruptly, thus avoiding wire-drawing of the liquid past the valve when it is near its seat.

It is desired to form a constricted outlet from the valve chamber, in combination with the valve structure which will enable us to move the valve quickly when near its seat.

The drawing herewith shows a central vertical section through a valve structure employing our invention.

The valve housing A is a T-shaped fitting with an inlet opening 1 threaded to receive a flow pipe. The outlet opening 2 is presented downwardly in the drawing altho the valve may operate in any direction. The downstream side is termed for convenience the "lower" side. A flow bean, or plug, 3 is screwed in the outlet opening, said plug having a constricted channel 4 therethrough for the fluid. The flow bean 3 may have a flow passage therein of any desired size to regulate the rate of flow in an obvious manner.

The upper side of the T-shaped housing has a stuffing box 5 therein, with a packing 6 and gland 7, said gland screwing within the upper end of the casing.

A valve B, having a cylindrical body 8 fits slidably within the chamber 10 formed in the housing. The lower end of the valve is beveled at 11 to fit within a seat 12 at the upper end of the outlet opening 2.

The body 8 of the valve terminates within the stuffing box 5 and has a stem 13 extending upwardly from the housing. A stuffing box about the stem is formed by the upper end of the gland 7 which has a packing receiving recess 14 formed about the stem. Compressible packing 15 therein may be compressed by a gland 16 adapted to be forced downwardly by the cap 17 screwed over the upper threaded end of the member 7.

The valve body 8 has its interior recessed from the lower end to provide an inner chamber 18 in the upper end of which is connected by passages 19 with the interior chamber 21 of the gland 7, said passages issuing through shoulders 20 on the upper end of the valve body.

The valve may be operated automatically through means of a float controlled lever or may be worked by hand. The valve, when constructed as shown, will tend to operate quickly when the valve member nears its seat. The valve has the fluid pressure thereon upwardly unbalanced when the valve is open, thus tending to hold it normally in an opened position. The fluid entering the chamber 10 exerts a pressure upwardly slightly greater than the pressure downwardly. That is, the areas of the shoulders 9 and 20 are less than the areas at the lower ends of the valve plus the upper area of the passage 18. The valve will therefore tend to stay open.

When the valve is moved downwardly to its seat, the pressure of the fluid below the valve will be gradually shut off and the pressure in the chamber 10 will tend to build up. There will be a preponderance of pressure upon the shoulders 11 which will force the valve abruptly into a closed position, thus preventing any tendency of the valve to remain off its seat when nearly closed.

When the valve is later opened, the raising of the valve slightly from the seat will allow the pressure fluid to enter past the valve to the space above the flow bean 3 faster than the pressure can escape through the channel 4 and the pressure will hence build up below the valve and the valve will be forced abruptly open by the normal preponderance of pressure below the valve.

It will be noted that this valve is designed particularly for use with a valve housing having a constricted opening such as is provided by a flow bean 3. This combination is a particularly effective one, enabling the valve to operate for comparatively long periods before the valve is worn sufficiently to necessitate repair.

What we claim as new is:

1. A device of the character described comprising a valve housing having an inlet opening thereto and a constricted outlet therefrom, a valve seat spaced above said outlet, a valve shaped to fit said seat, a stuffing box about said valve forming a pressure space above said valve, said valve having a passage connecting with said pressure space, the preponderance of fluid pressures on the valve areas at its upper and lower sides being normally upward when said valve is away from its seat, said pressures tending to preponderate downwardly as said valve is near said seat.

2. In a device of the character described, a valve housing having an inlet opening thereto, a constricted outlet opening therefrom, a valve seat spaced above said outlet, a hollow cylindrical valve shaped to fit said seat said valve having passages therethrough connecting with a chamber above said valve, upper shoulders on said valve in said chamber, lower outer shoulders thereon in said housing, whereby the preponderance of pressures are normally upwardly on said valve when said valve is open but tend to become unbalanced to preponderate downwardly as said valve nears its seat in the manner set forth.

3. In a device of the character stated, a valve housing having an inlet opening and an outlet opening, a flow bean in said outlet opening tending to reduce the rate of flow therethrough, a valve seat above said outlet opening, and a valve in said seat, preponderance of fluid pressure on said valve being normally upward except when said valve is in a position close to its seat.

4. A valve housing having a lateral inlet and a lower outlet, a flow bean in said outlet, a valve adapted to close said outlet, said valve being slidable in said housing, packing about said valve, a pressure chamber above said valve, said chamber being connected with the space below said valve, said valve being formed to be held normally open by the pressure fluid, the pressure above becoming in excess of the pressure from below as said valve is moved to its seat.

5. A valve housing having a lateral inlet and a lower outlet, a flow bean in said outlet, a valve adapted to close said outlet, said valve being slidable in said housing, packing about said valve, a pressure chamber above said valve, said valve being formed to present unbalanced areas downwardly to the pressure fluid when said valve is seated, said flow bean restricting the flow of fluid so that the pressure below said valve becomes immediately excessive when said valve is raised slightly from its seat.

In testimony whereof, we hereunto affix our signatures this 31st day of October, A. D. 1927.

HAROLD W. FLETCHER.
RALPH NEUHAUS.